Nov. 20, 1962  R. J. CURRAN  3,064,776
ONE-WAY CLUTCH
Filed July 8, 1960  2 Sheets-Sheet 1
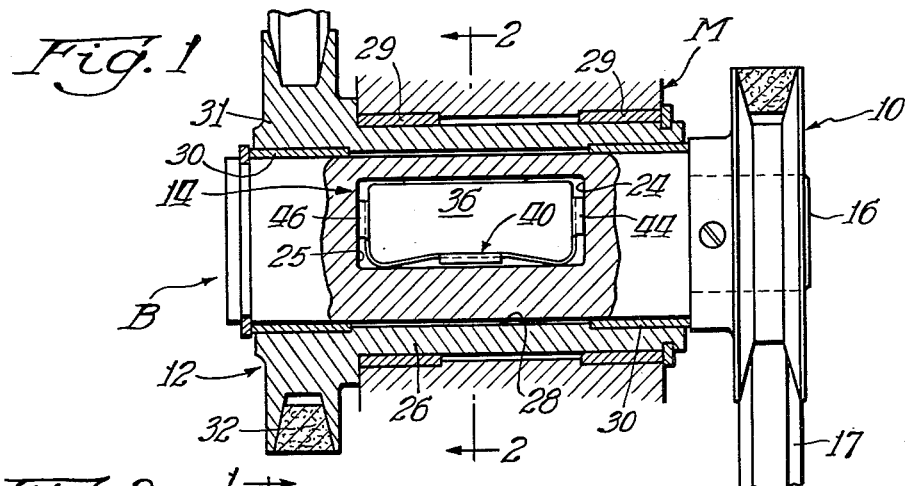
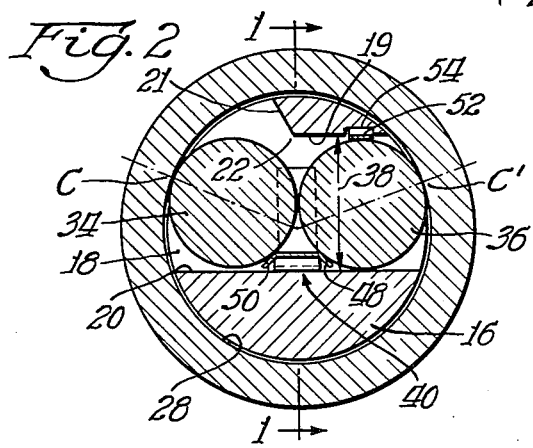
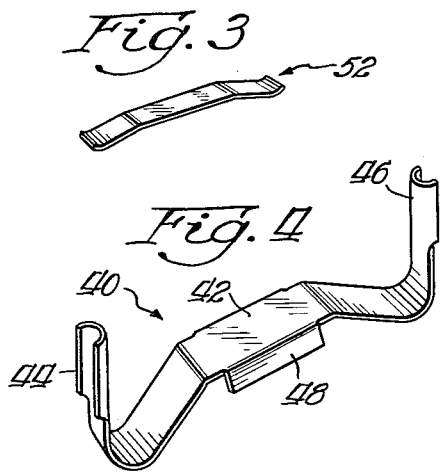
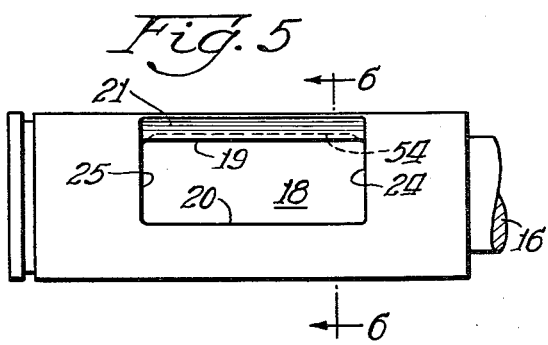
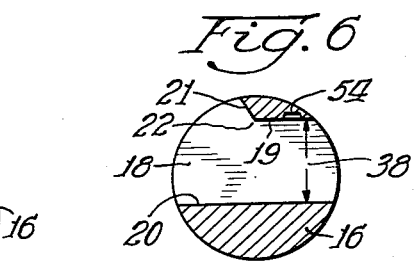
Inventor:
Robert J. Curran
By: Frank R. Thiergort
Atty.

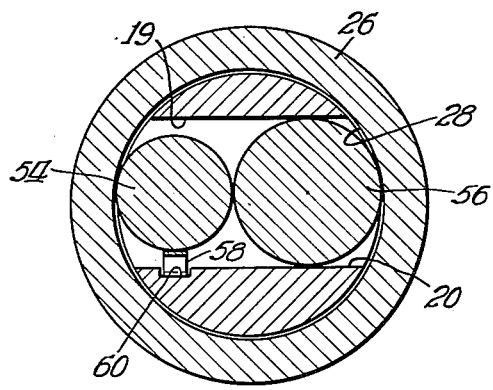
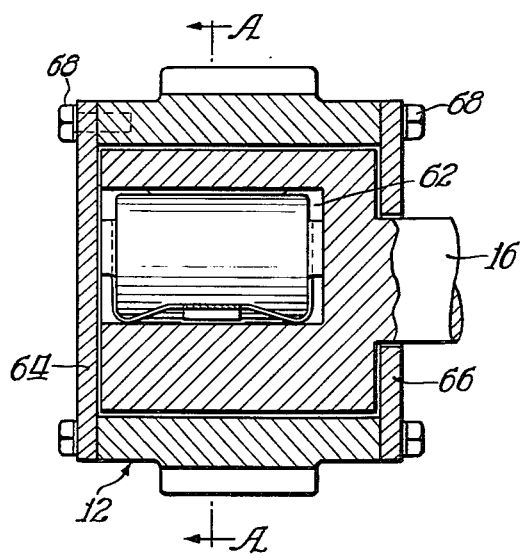

United States Patent Office 3,064,776
Patented Nov. 20, 1962

3,064,776
ONE-WAY CLUTCH
Robert J. Curran, Elmhurst, Ill., assignor to Borg-Warner Corporation, Chicago, Ill., a corporation of Illinois
Filed July 8, 1960, Ser. No. 41,572
6 Claims. (Cl. 192—45)

The present invention relates to one-way clutches and particularly to a one-way clutch of the type using roller elements. In conventional one-way engaging devices utilizing roller elements, it has often been customary to use cammed races in connection with roller elements to effect engagement between two members, i.e., one of the races having a plurality of cam surfaces, each of which are designed to cooperate with one of the roller elements. In addition, these clutches have ordinarily required a large number of parts, particularly a large number of rollers or other wedging elements. The use of cammed surfaces, of course, requires expensive precision machining operations, usually to close tolerances. In addition, in roller clutches using cam surfaces, it is noted that the cams are usually loaded at the same position which causes a great deal of localized wear and consequently limits the life of this type of clutch. In a sprag clutch the sprags are loaded at the same position and this concentration of the wear has a tendency to reduce the life of the individual sprags and consequently the life of the composite clutch device. It will also be appreciated that inherent in the construction of most of the sprag or roller clutches is the limitation of size, since the sprags or rollers are generally spaced circumferentially between inner and outer races formed on members to be operatively connected. More specifically, this results in materially limiting the overall minimum diameters of the conventional sprag or roller clutch devices.

It is an object of the present invention to overcome a number of the above deficiencies and to provide an extremely simple device which will perform the one-way engaging function.

One of the objects of this invention is to provide an improved device of the present character to eliminate the need for complicated cam geometry thereby avoiding the substantial precision machining operations previously required.

It is a further object of this invention to provide a device having a minimum number of parts; and which may be readily and economically manufactured in a wide range of sizes from miniature sizes to the largest required.

It is a further object or this invention to provide a one-way engaging device having driving and driven members, one of the members being provided with an internal cylindrical surface and the other member having a transverse slot formed therein for receiving roller elements adapted to effect an operative connection between the driving and driven members.

Still another object of this invention is to provide a device wherein the engaging portions are not subject to localized and concentrated wear.

The foregoing and other objects and advantages of the present invention will become apparent from the following detailed description thereof when read in conjunction with the accompanying drawings, wherein:

FIG. 1 is an axial sectional view of an example of a driving and driven assembly incorporating one preferred form of the present one-way engaging device, this view being taken partially on line 1—1 of FIG. 2;

FIG. 2 is an end sectional view at line 2—2 of FIG. 1 showing a slotted shaft and roller clutch elements;

FIG. 3 is a perspective of one type of leaf spring;

FIG. 4 is a perspective of another type of leaf spring;

FIG. 5 is a detailed view of the slotted shaft;

FIG. 6 is a sectional view of the slotted shaft taken at line 6—6 of FIG. 5;

FIG. 7 is a modified form of the invention showing different size roller clutch elements;

FIG. 8 is an elevation view in section of another modified form of the invention.

Referring now to the drawings wherein like reference numerals in the different views identify identical parts, the device B comprises a driving member 10, a driven member 12, and clutching means 14 for operatively connecting the driving and driven members. The driving member 10 comprises a drive shaft 16 which may be constantly driven by any means, such as, for example, by a pulley and belt arrangement 17 as shown in FIG. 1. The driving shaft 16 has formed therein a longitudinally extending transverse slot 18 defined by surfaces 19 and 20. As seen in FIG. 6, it will be noted that the shaft 16 has a portion thereof cut away so as to form a surface 21. This surface 21 extends the length of the slot 18 and intersects with the surface 19 at a longitudinally extending line shown as point 22. Surfaces 24 and 25 define the ends of the slot 18. While the slot 18 may be centrally positioned in the shaft, in a preferred embodiment of this device, the slot 18 is positioned slightly off-center as is clearly seen in FIG. 5.

The driven member 12 comprises a general cylindrical longitudinally extending member 26 having formed thereon a cylindrical surface 28 which may be referred to as an outer race.

The member 12 may be adapted to be rotatably mounted within a stationary structure M on bearings 29. The drive shaft 16 may then be rotatably mounted within the member 12 by means of bearings such, for example, as bronze bearings 30 secured to the member 26. In the embodiment as shown, a running bearing clearance is provided between the shaft 16 and the cylindrical surface 28 of the member 26. By way of example an output means such as the output pulley 31 may be formed on or connected to the member 26 by any suitable means. The output from pulley 31 may be transmitted to other means to be driven (not shown) by a belt 32. The belt and pulley arrangement is merely illustrative of the type of output means that may be connected to the member 26. Other means such as gearing, for example, could just as easily be used.

It will be appreciated from the foregoing and from the more detailed description of the operation as hereinafter described that the driven member 12 may also serve as a driving member if the driving member 10 is used as a driven member. For purposes of explanation throughout the specification, however, the driving member will be considered as 10 and the driven member as 12.

The clutching means used in this invention for operatively connecting the driving and driven members comprises a pair of roller elements 34 and 36. In the preferred form of this invention the roller elements 34 and 36 are of substantially the same diameter, however, as will be further illustrated, these roller elements could be of different diameters. The sum of the diameters of the roller elements 34 and 36 is slightly less than the inner diameter of member 26, that is, the diameter of the cylinder defined by the surface 28. Referring to FIG. 2, it will be noted that the diameter of the roller element 36 is slightly less than the width of the slot 18 indicated by the distance marked 38. While an energizing spring means is not absolutely necessary to the operation of the device, such an energizing spring means may be used to urge the rollers into contact with each other and with the cylindrical surface 28 of the member 26. An energizing spring means such as that shown at 40 in FIG. 2 may be positioned in the slot 18 adjacent the surface 20 and between the roller elements 34 and 36. One form of the spring 40 may be such as that shown in FIG. 4, namely, a small leaf type compression spring.

The spring 40 comprises a generally U-shaped structure having a substantially flat central portion 42 and two upstanding portions 44 and 46 formed at each end of the central portion 42. Extending laterally from the central portion are two tabs 48 and 50. When the spring 40 is in position between the two rollers 34 and 36, the tabs 48 and 50 press against the rollers 34 and 36. The two upstanding portions 44 and 46 contact the edges of the rollers and prevent the spring 40 from moving out of its position between the rollers.

The energizing spring means may take other forms and may be otherwise positioned with respect to the rollers as hereinafter described in connection with the embodiment shown in FIGURE 7.

In addition, the device may optionally be provided with an anti-back lash means which in this device may take the form of a small flat leaf compression spring, such as 52, shown in FIG. 3. The spring 52 may be positioned in a slot 54 in the surface 19 so that it urges the roller 36 against the surface 20.

In operation, when the driving member 10 is rotated in a clockwise direction as indicated by the arrow in FIG. 2, the roller elements 34 and 36 will tend to remain in a loose position in the slot 18 but maintain a slight frictional rolling contact with the cylindrical surface 28. The roller element 34 will also tend to maintain a slight frictional contact with the cylindrical surface 28 due to the centrifugal force which will tend to throw it outwardly, but the frictional contact with the cylindrical surface 28 will tend to move the roller 34 to the left as viewed in FIG. 2, that is, toward the surface 20 of the slot 18. In other words, the rollers 36 and 34 will tend to occupy a non-wedging position by moving toward a diametral position with respect to the member 26. Since the sum of the diameters of the roller elements 34 and 36, as previously stated, is less than the inner diameter of the member 26, the rollers 34 and 36 will be in a relatively loose condition and will not exert a wedging effect between the driving and driven members. In this condition, the drive shaft 16 is in an overrunning condition with respect to the member 26.

If, on the other hand, an attempt is made to rotate the driving member 10 in a counterclockwise direction (as seen in FIG. 2) with respect to the member 26, the driving and driven members will be locked and will rotate as a unit. Under these conditions, it will be noted that the frictional contact of the cylindrical surface 28 with the roller element 34 together with the effect of the energizing spring 40 will tend to move the rollers into contact with each other and into a wedging engagement with the cylindrical surface 28. The energizing spring 40 has the effect of urging the roller element 34 upward and to the right as viewed in FIG. 2 so that it assists the frictional force applied by the member 26 to the roller element 34 in tending to move the roller elements 34 and 36 into a space which is smaller than the inner diameter of the member 26. Thus a wedging effect is achieved and the members 10 and 12 are locked into engagement.

It will be observed from FIG. 2 that when the roller elements are wedged so as to effect an operable connection between the driving and driven members they are respectively in contact with each other and with the race surface 28 at points C and C'. It will be observed that these points are substantially more than 90 degrees apart but cannot be exactly 180 degrees apart because under the latter condition there would be no wedging action.

The roller and slot sizes are so proportioned that the points of contact of the rollers with the race surface defines an arc of less than 180 degrees which is preferably between 150 degrees and 170 degrees.

As previously noted, a portion of the shaft 16 extending for the length of the slot 18 has been cut away so as to form a surface 21 which intersects with the surface 19 at a longitudinally extending line 22. As can easily be seen in FIG. 2, this cut away portion provides a clearance for the roller 34 when the roller 34 is snapped into wedging engagement with the member 26 and the other roller element 36. It will be noted that if the surface 19 were extended there would be a possible interference between the extended portion of the surface 19 and the roller 34. The anti-back lash spring 52 is effective to keep the roller 36 in contact with the surface 20 even during overrunning, so that no back lash will occur as the rollers move from an unlocked condition into a locked condition, i.e., wedging engagement.

FIG. 7 shows a modified form of the invention wherein the roller elements are of unequal size, the roller element 54 being smaller than the roller element 56. It will also be noted in this embodiment that the surface 19 is unbroken by a cut away portion such as is seen in the embodiment shown in FIG. 2. Because the roller element 54 is of a smaller diameter and of considerably less diameter than the width of the slot, this is sufficient to provide the clearance which was provided by the cut away portion shown in FIG. 2.

In addition, the embodiment shown in FIG. 7 also shows an alternative position of the energizing spring 58. Here the spring 58 is positioned so as to be in contact only with the roller 54 instead of both rollers. The energizing spring here takes the form of a small leaf spring and may be similar to the anti-back lash spring 52. It may be mounted in a longitudinally extending slot portion 60 formed in the surface 20. It is apparent that since the leaf spring 58 urges the roller 54 in an upward direction as viewed in FIG. 7, it has the effect of urging the roller 54 into contact with the roller 56 and the cylindrical surface 28. It is also apparent that an energizing spring mounted between the two rollers could be utilized in the same manner as shown in FIG. 2.

Referring now to FIGURE 8 which shows another modified form of the invention, the driving member 10 comprises a drive shaft 16 which has a slot 62 formed in one end thereof. It differs only from the device shown in FIG. 1 in that the slot is formed in the end of the drive shaft rather than in a central portion of the drive shaft. A sectional view from the left in FIG. 8 along the line A—A will show up the same as the structure shown in FIG. 2. The device of FIG. 8 operates in the same manner as the device shown in FIG. 2. The device of FIG. 8 has the additional advantage of even greater simplicity in that the slot 62 is easily formed in the end of the drive shaft 16 by a variety of well known means. It will be noted that end plates 64 and 66 can easily be affixed to the driven member 12 by suitable means such as bolts 68 to prevent relative longitudinal movement between the driving and driven members. Snap rings may also be used in a well known manner to prevent this relative movement.

It will thus be seen that the invention herein described with its various modifications presents an efficient, simple, easily constructed one-way engaging device having a minimum number of parts devoid of a number of precision machining operations often required in the construction of such devices.

While certain preferred embodiments of the invention have been specifically disclosed, it is understood that the invention is not limited thereto as a number of variations will be readily apparent to those skilled in the art and the invention is to be given its broadest possible interpretation within the terms of the following claims.

I claim:

1. A one-way engaging device comprising two concentrically disposed members relatively arcuately movable in one direction, the first one of said members including means defining a cylindrical raceway surface, means for engaging and disengaging said members comprising roller elements, means formed on said second member for retaining said roller elements in a position wherein the roller elements are adapted to wedgingly engage said raceway surface to effect an operable connection between said two members and prevent relative rotation of said two members in one direction but effective to permit relative rotation between said two members in the opposite direction, said roller elements when said engagement is effected being in force transmitting contact with each other and with said raceway surface at positions on said raceway surface which are more than 120 degrees apart.

2. The device of claim 1 including a biasing means for urging said roller elements into contact with each other and with said race surface to assist in effecting an operable connection between said two members.

3. The device of claim 1 including an anti-back lash means in contact with one of said roller elements.

4. A one-way engaging device comprising two concentrically disposed members relatively rotatable in one direction, the first member including means defining an outer race, means defining a transversely extending slot extending entirely through said second member, means for engaging and disengaging said members comprising a pair of roller elements disposed in said slot means and adapted to wedgingly engage said race means to effect an operable connection between said two members and prevent relative rotation of said two members in one direction but effective to permit relative rotation between said two members in the opposite direction.

5. The device of claim 4 wherein said slot means is off center.

6. The device of claim 4 wherein the sum of the diameters of the roller elements is slightly less than the diameter of the outer race.

References Cited in the file of this patent

UNITED STATES PATENTS

| 1,878,053 | Winger | Sept. 20, 1932 |
| 2,371,442 | Hammond | Mar. 13, 1945 |

FOREIGN PATENTS

| 25,412 | Norway | Jan. 18, 1915 |
| 278.427 | Great Britain | Oct. 5, 1927 |